United States Patent [19]
Maggio et al.

[11] Patent Number: 5,731,930
[45] Date of Patent: Mar. 24, 1998

[54] INSULATED WIRE GUIDES FOR AN ACTUATOR ASSEMBLY

[75] Inventors: Mark S. Maggio; David S. Allsup, both of Oklahoma City, Okla.

[73] Assignee: Seagate Technology, Inc., Scotts Valley, Calif.

[21] Appl. No.: 656,612

Related U.S. Application Data

[60] Provisional application No. 60/003,403, Jun. 15, 1995.

[22] Filed: May 31, 1996

[51] Int. Cl.⁶ ........................................... G11B 5/48
[52] U.S. Cl. ........................................... 360/104
[58] Field of Search ........................... 360/104–106

[56] References Cited

U.S. PATENT DOCUMENTS

| | | |
|---|---|---|
| 5,012,368 | 4/1991 | Bosier ........................... 360/104 |
| 5,231,556 | 7/1993 | Blanks . | |
| 5,404,636 | 4/1995 | Stefansky et al. . | |
| 5,455,728 | 10/1995 | Edwards ........................... 360/105 |

*Primary Examiner*—A. J. Heinz
*Attorney, Agent, or Firm*—Bill D. McCarthy; Edward P. Heller, III; Randall K. McCarthy

[57] ABSTRACT

Method and apparatus for an improved insulating wire guide for a disc drive actuator assembly. The insulating wire guide is integrally formed with an actuator arm and comprises a rigid, non-conductive material formed onto the actuator arm, the wire guide having a base portion on which head wires rest and tabs extending from the base portion to form a channel through which the head wires are routed. The wire guide and actuator arm are formed from an extrusion having a cross-sectional shape substantially that of the actuator arm, the extrusion including dams forming a channel along one side of the extrusion. The non-conductive material is applied to the extrusion, substantially filling the channel, and, after the non-conductive material is cured, the extrusion and the cured non-conductive material is machined to provide the desired configuration of the actuator arm and the wire guide.

17 Claims, 4 Drawing Sheets

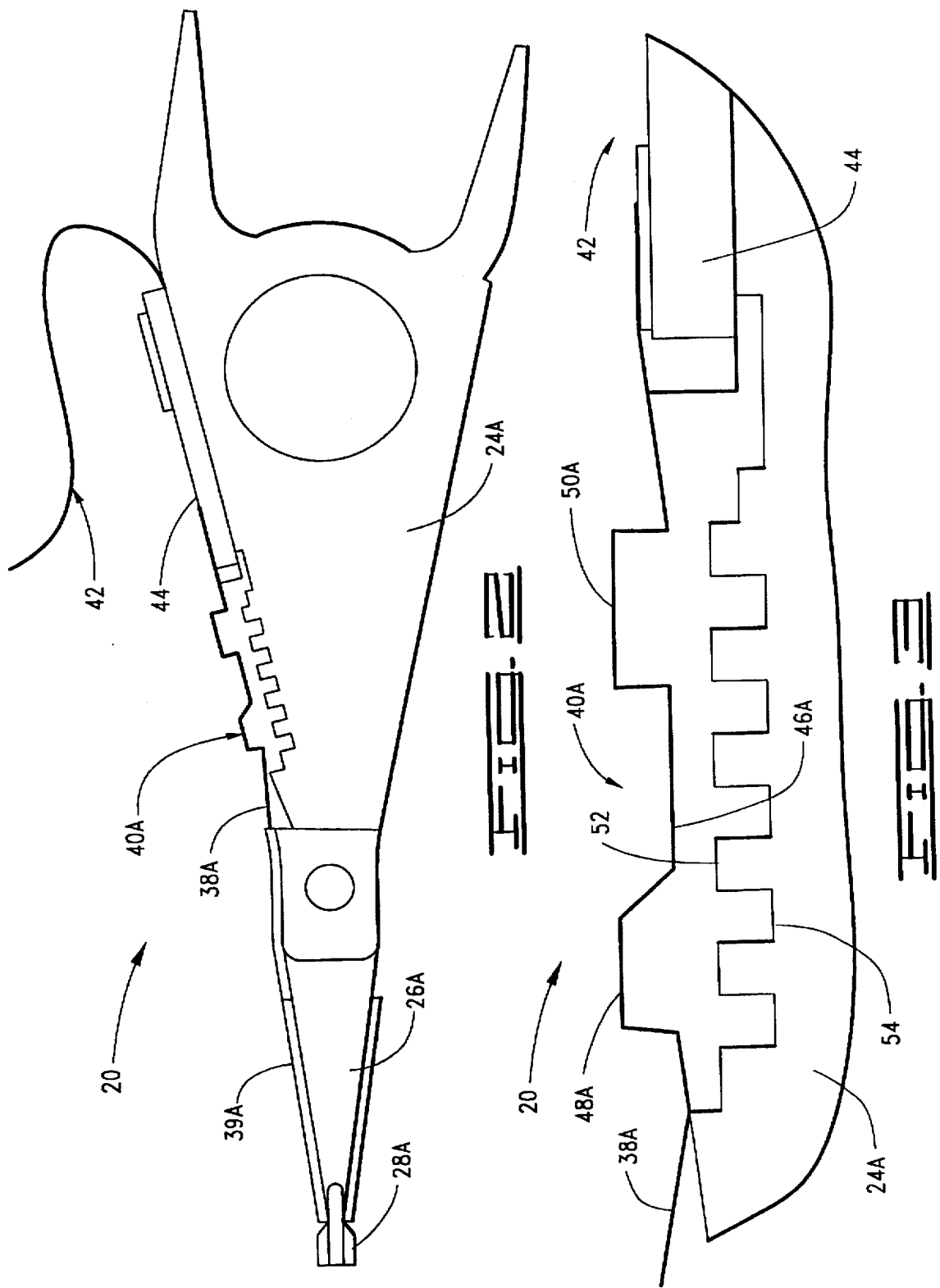

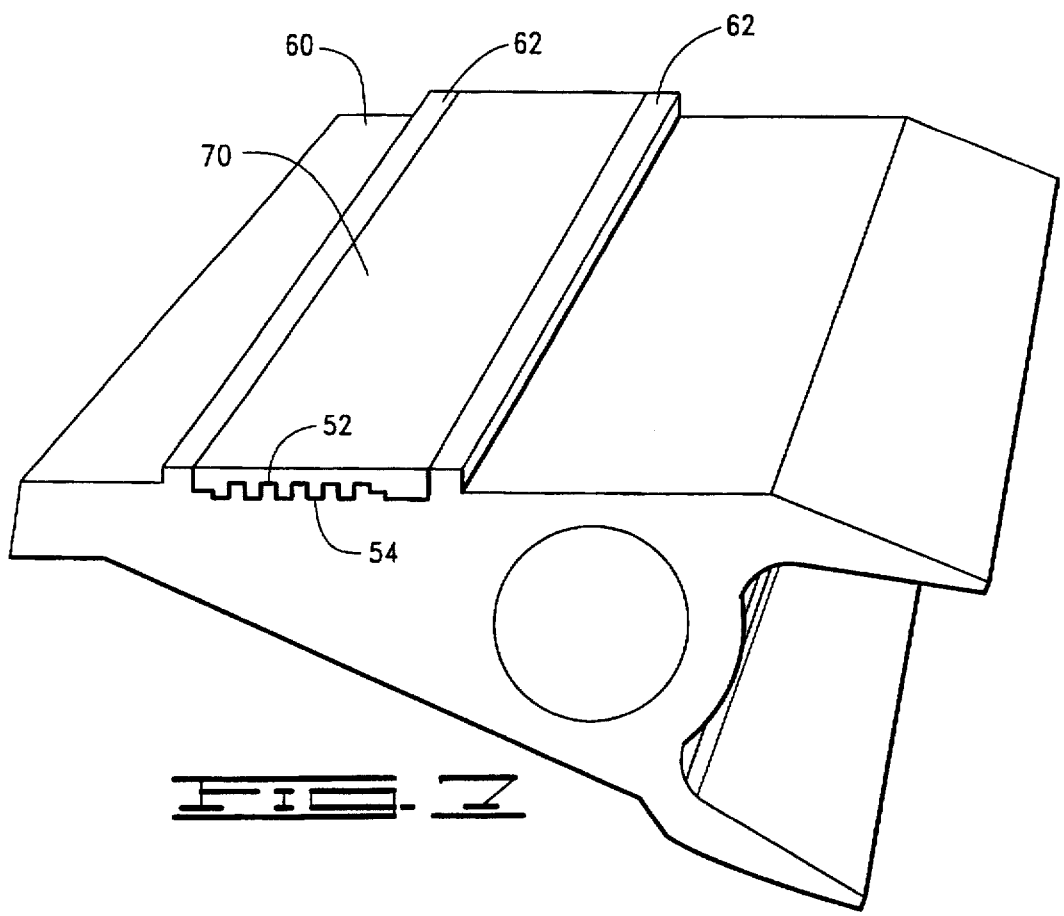
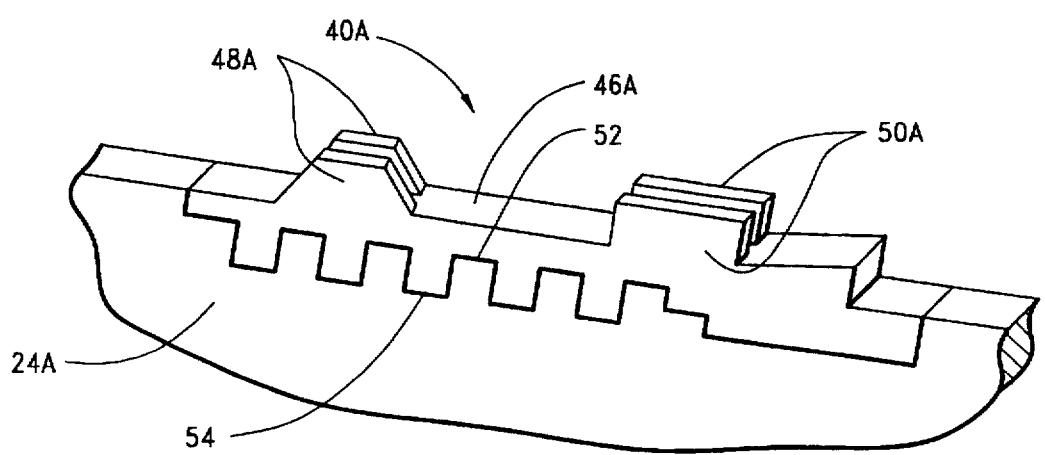

INSULATED WIRE GUIDES FOR AN ACTUATOR ASSEMBLY

CROSS REFERENCE TO RELATED APPLICATION

This application claims priority to provisional application Ser. No. 60/003,403 filed Jun. 15, 1995 which is hereby incorporated by reference.

BACKGROUND OF THE INVENTION

1. Field of the Invention

This invention relates generally to the field of disc drive data storage devices, and more particularly, but not by way of limitation, to insulated wire guides used to secure head wires in a disc drive actuator assembly.

2. Discussion

Disc drives are commonly used in workstations, personal computers, laptops and other computer systems to store large amounts of data in a form that can be made readily available to a user. In general, a disc drive comprises one or more magnetic discs that are rotated by a spindle motor at a constant high speed. The surface of each disc is divided into a series of data tracks which are spaced radially from one another across a band having an inner diameter and an outer diameter. The data tracks extend generally circumferentially around the discs and store data in the form of magnetic flux transitions within the radial extent of the tracks on the disc surfaces. Typically, each data track is divided into a number of data sectors that store fixed sized data blocks.

A head includes an interactive element such as a magnetic transducer which senses the magnetic transitions on a selected data track to read the data stored on the track, or to transmit an electrical signal that induces magnetic transitions on the selected data track to write data to the track. The magnetic transducer includes a read/write gap that senses position of the transducer and feeds information to a servo positioning system such that the heads are suitably positioned for interaction with the magnetic transitions on the data tracks of a disc as the disc rotates.

As is known in the art, each head is mounted to a rotary actuator arm and is selectively positionable by the actuator arm over a preselected data track of the disc to either read data from or write data to the preselected data track. The head structure includes a slider assembly, which houses the transducer and flies over the data tracks of the disc surface due to fluid air currents (also referred to as an "air bearing") caused by rotation of the disc.

Typically, several discs are stacked on top of each other and the surfaces of the stacked discs are accessed by the heads mounted on a complementary stack of actuator arms which comprise an actuator assembly, or "E-block". The E-block generally includes head wires which conduct electrical signals from the heads to a flex circuit, which in turn conducts the electrical signals to a circuit board mounted to a disc drive basedeck. The head wires are typically routed along the actuator arms between adjacent rotating discs of the disc drive. Further, the head wires typically include a thin layer of insulation (such as a varnish type of material) around the wires. However, due to the small geometries of the wires, corresponding layers of insulation are very thin and are thus prone to damage due to nicks and fretting.

Nicks in the layers of insulation around the head wires generally arise during handling of the actuator arms during assembly and testing processes. Additionally, fretting of the layers of insulation can occur at points where the head wires rub against an assembled E-block during operation of a disc drive over time. When the fretting process is sufficiently severe, the insulation layers at such points can eventually wear away, allowing electrical shorting between the head wires and the E-block.

Typically, tubing is used as an insulator to prevent this wear; however, automated head gimbal assembly processes generally do not accommodate the use of such tubing. The assembly of the head gimbal assembly is automated in order to reduce electrostatic damage to the transducer, as well as to reduce mechanical damage due to the handling of the fragile gimbal assembly. Automation of the head gimbal assembly involves wire routing and connections between the transducer and a test/carrier in one operation. After the head wires are routed, the ends of the wires are connected to objects (the transducer and the test/carrier), thus preventing the subsequent application of tubing to the head wires. Alternatively, during non-automated head gimbal assembly processes, the wires are pre-assembled with the tubing and the attachment of the wires to the transducer and the test/carrier are performed manually.

Because of the minimal clearance between the actuator arms and the discs, special features are typically provided in the actuator arms to position and capture the head wires to prevent contact between the wires and the discs. However, running the head wires along the actuator arms creates the risk if potential electrical shorting between the head wires and the actuator arms, as a result of the exposed conductive wire from nicks and fretting in the head wire insulation.

Thus, a variety of methodologies have been employed in the prior art to minimize shorting problems between the head wires and the actuator arms. A common approach is to machine wire guides along the edges of the actuator arms and then provide a thin coating layer of a non-conductive material on the actuator arms. One such methodology used to provide the thin coating layer is referred to as "E-coating" and comprises immersing a machined actuator arm in an epoxy bath, wherein the actuator arm is coated with a thin layer of non-conductive epoxy. The resulting thickness of the epoxy layer depends upon several control variables associated with the coating process. As a result, in order to maintain high dimensional accuracy of critical surfaces of the coated actuator arm, a second machining operation is typically required, which increases the cost of the process and can introduce defects in the actuator arm in the form of burrs at interfaces between newly machined surfaces and the coating layer.

An alternative to the E-coating process is a process wherein an insulating layer is sprayed onto selected locations of the actuator arm. Although such a process generally eliminates the need for a second machining operation, obtaining consistent coating of the actuator arms can be difficult. For example, as machined wire guides on an actuator arm have relatively small dimensions, it can be difficult to adequately coat the inside surfaces of the wire guides in such a process.

As provided hereinabove, in non-automated assembly processes the head wires are further insulated from the actuator arm by providing insulative tubing around the head wires. This generally involves cutting tubing to the desired length and then slipping the tubing over head wires. Although the tubing provides protection for the head wires, it also requires additional space, necessitating larger grooves in the actuator arm wire guides. Additionally, as disc drive internal dimensions continue to decrease, clearance may not be available to accommodate the tubing in certain cases. The steps required to provide the tubing also add to the cost of the manufacturing process, and are not readily implementable in an automated manufacturing process.

Finally, another prior art method for providing insulation between the head wires and the actuator arm is to use a specially designed, non-conductive shield fabricated from a suitable material, such as polyamide. The disadvantage associated with the use of such a shield include the requirement for extra space to accommodate the shield and the cost associated with procuring and installing the shield during manufacturing. For a general discussion of E-block assembly techniques, including the routing of head wires in an E-block, see U.S. Pat. No. 5,404,636 entitled METHOD OF ASSEMBLING A DISK DRIVE ACTUATOR, issued Apr. 11, 1995 to Stefansky et al., assigned to the assignee of the present invention and incorporated herein by reference.

Thus, there is a need for an improved, inexpensive and reliable approach to providing insulated head wire guides for actuator arms in a disc drive E-block.

SUMMARY OF THE INVENTION

The present invention provides an apparatus and method for forming an improved insulating wire guide for a disc drive actuator assembly. The actuator assembly comprises an actuator arm extending radially from a pivot shaft, a gimbal assembly extending radially from the actuator arm, a head attached to the distal end of the gimbal assembly, and head wires routed from the head along the gimbal assembly and the actuator arm.

The insulating wire guide of the present invention is integrally formed with the actuator arm and comprises a rigid, non-conductive material formed onto the actuator arm, the wire guide having a base portion on which the head wires rest and tabs extending from the base portion to form a channel through which the head wires are routed. The base portion of the wire guide is provided with sufficient radial length to prevent contact between the head wires and the actuator arm and the tabs are provided with sufficient height to retain the head wires adjacent to the wire guide.

The wire guide and actuator arm are formed from an extrusion having a cross-sectional shape substantially like that of the actuator arm, the extrusion including dams forming a channel along one side of the extrusion. The non-conductive material is applied to the extrusion, substantially filling the channel, and, after the non-conductive material is cured, the extrusion and the cured non-conductive material is machined to provide the desired configuration of the actuator arm and the wire guide. The wire guide is preferably formed from epoxy and the extrusion is preferably formed from aluminum. Additionally, grooves are preferably formed in the extrusion between the dams and filled with the non-conductive material, subsequently providing interlocking teeth between the actuator arm and the wire guide.

An object of the present invention is to provide improved insulation of head wires in a disc drive actuator assembly.

Another object of the present invention is to reduce the shorting of head wires to an actuator arm as a result of damage to head wires from nicks and fretting.

Still another object of the present invention is to eliminate the need for subsequent machining operations of the actuator arm to control critical dimensions after the application of an insulating layer to the actuator arm.

Yet another object of the present invention is to provide an inexpensive and reliable approach to insulating the head wires in an actuator assembly.

Other objects, advantages and features of the present invention will be apparent from the following description when read in conjunction with the drawings and appended claims.

BRIEF DESCRIPTION OF THE DRAWINGS

FIG. 2 is a top plan view of the E-block of FIG. 1.

FIG. 3 is a top plan view of a portion of the E-block of FIGS. 1 and 2, showing the wire guide of the E-block in greater detail.

FIG. 4 is an isometric view of the wire guide of the E-block.

FIG. 7 is an isometric view of the extrusion with the addition of an epoxy material, which is added during fabrication of the E-block.

DETAILED DESCRIPTION OF THE PREFERRED EMBODIMENT

Figure 1:
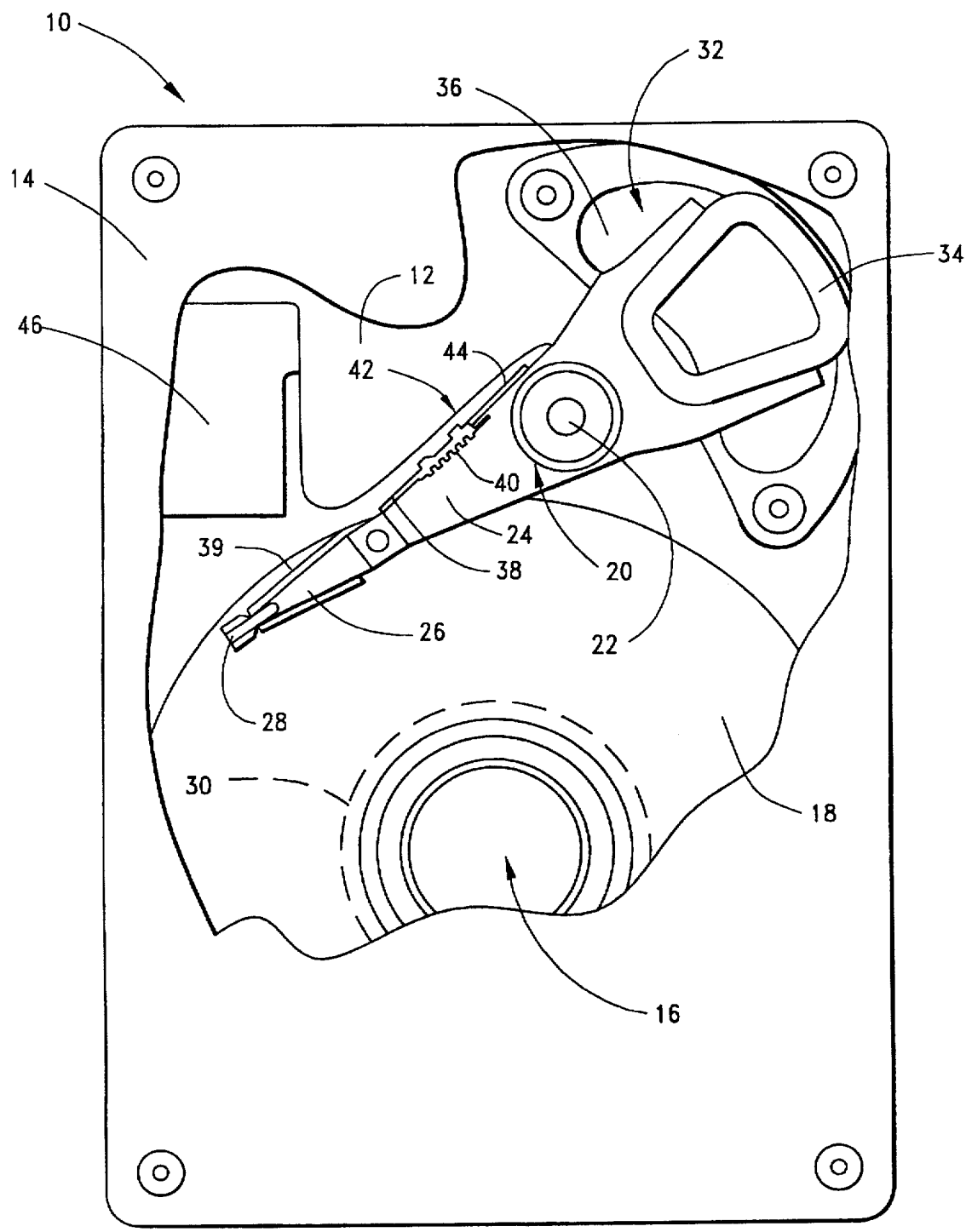
FIG. 1 is a top plan view of a disc drive in which the present invention is particularly useful.

Turning now to the drawings and more particularly to FIG. 1, shown therein is a plan view of a disc drive 10 in which the present invention is particularly useful. The disc drive 10 includes a basedeck 12 to which various disc drive components are mounted and a top cover 14, which provides a sealed internal environment for the disc drive 10. The top cover 14 is shown in a partial cut-away fashion to expose selected components of interest.

Mounted to the basedeck 12 is a spindle motor (shown generally at 16) to which a plurality of discs 18 are mounted for rotation at a constant high speed. Adjacent the discs 18 is an actuator assembly 20 (hereinafter sometimes also referred to as an "E-block") which pivots about a pivot shaft 22 in a rotary fashion. The E-block 20 includes actuator arms 24 which support gimbal assemblies 26 (hereinafter also sometimes referred to as "load springs"). The gimbal assemblies 26 in turn support heads 28, with each of the heads 28 corresponding to a surface of one of the discs 18. As provided hereinabove, the heads 28 are positionably located over data tracks (not shown) of the discs 18 in order to read data from and write data to the tracks, respectively. At such time that the disc drive 10 is not in use, the heads 28 are moved to landing zones (denoted at broken line 30), which are located in FIG. 1 near the inner diameter of the discs 18.

It will be recognized that the E-block 20 is typically provided with a latching arrangement (not shown) to secure the E-block 20 when the disc drive 10 is not in use; however, such a latching arrangement is not germane to the present invention and so has not been shown in the drawings, for clarity of illustration. For more discussion of typical E-block latching arrangements, see U.S. Pat. No. 5,231,556 entitled SELF-HOLDING LATCH ASSEMBLY, issued Jul. 27, 1993 to Blanks, assigned to the assignee of the present invention and incorporated herein by reference.

Continuing with FIG. 1, the E-block 20 is controllably positioned by way of a voice coil motor (VCM, shown generally at 32), comprising an actuator coil 34 immersed in the magnetic field generated by a permanent magnet 36. It will be recognized that a magnetically permeably flux path (such as a steel plate) is mounted above the actuator coil 34 to complete the magnetic circuit of the VCM 32, but for purposes of illustration this flux path has not been shown in FIG. 1. When controlled DC current is passed through the actuator coil 34, an electromagnetic field is set up which interacts with the magnetic circuit of the VCM 32 to cause the actuator coil 34 to move relative to the permanent magnet 36 in accordance with the well-known Lorentz relationship. As the actuator coil 34 moves, the E-block 20 pivots about the pivot shaft 22, causing the heads 28 to move across the surfaces of the discs 18.

To provide the requisite electrical conduction paths between the heads 28 and disc drive read/write circuitry (not shown), head wires 38 are routed on the E-block 20 from the heads 28, along the gimbal assemblies 26, through wire guides 40 of the actuator arms 24 and to a conventional flex circuit assembly 42. The configuration and fabrication of the wire guides 40 will be discussed in greater detail hereinbelow; however, it will be recognized that the wire guides 40 serve to secure and insulate the head wires 38 from the actuator arms 24, the wire guides 40 being fabricated from an insulating material, such as epoxy, and the actuator arms 24 being fabricated from a conductive material, such as aluminum.

The head wires 38 are secured (by way of a suitable soldering process) to corresponding pads (not separately designated in FIG. 1) of a printed circuit board (PCB) 44 of the flex circuit assembly 42. In turn, the flex circuit assembly 42 is connected to a flex circuit bracket (shown generally at 46) in a conventional manner. Preferably, the head wires 38 are conductive wires having a relatively small diameter and are coated with a thin insulative layer (not separately designated). It will be recognized that this insulative layer is not present at the ends of the head wires 38 where the head wires 38 are soldered to the pads of the PCB 44.

FIG. 2 provides a top plan view of the E-block 20 of FIG. 1 (for purposes of clarity, the pivot shaft 22 and the actuator coil 34 of FIG. 1 have not been shown in FIG. 2). More particularly, FIG. 2 illustrates the configuration of a top wire guide (denoted as 40A) in relation to a top actuator arm 24A, a top gimbal assembly 26A, a top head 28A and top head wires 38A. It will be readily understood that the head wires 38A are routed by way of channels 39A of the gimbal assemblies 26 in a conventional manner.

The preferred method for fabricating the wire guides 40 will be discussed hereinbelow, but generally, the wire guide 40A of FIG. 2 comprises an electrically insulative material, such as epoxy, which is formed with the configuration as shown to secure and insulate the head wires 38A relative to the actuator arm 24A. As shown more particularly in FIG. 3, which provides a top plan view of a portion of the E-block 20 of FIGS. 1 and 2, the wire guide 40A includes a base portion 46A upon which the head wires 38A rest and tabs 48A, 50A which extend radially from the base portion 46A adjacent the head wires 38A to secure the head wires 38A. The wire guide 40A is further provided with a plurality of grooves (one designated at 52) which interlock with corresponding grooves (one designated at 54) of the actuator arm 24A as shown.

FIG. 4 provides an isometric view of the wire guide 40A and a portion of the actuator arm 24A. Although the head wires 38A are not shown in FIG. 4, it will be recognized that the head wires 38A are routed along the base portion 46A and through channels formed by the tabs 48A, 50A of the wire guide 40A.

Figure 5:
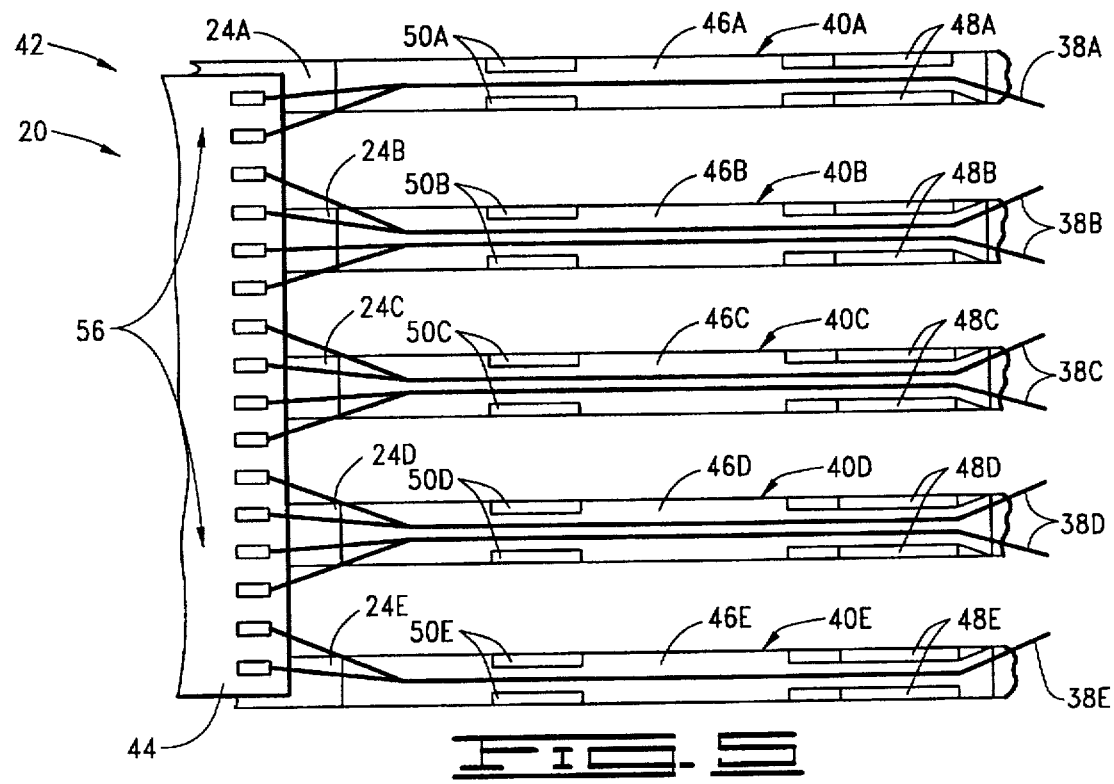
FIG. 5 is an elevational view of the E-block of FIGS. 1 and 2.

Referring now to FIG. 5, shown therein is an elevational view of the E-block 20 of FIGS. 1-3. More particularly, FIG. 5 shows the E-block 20 to comprise five actuator arms (denoted respectively as 24A-24E) and five corresponding wire guides (40A-40E) securing five sets of head wires (38A-38E). It will be recognized that the corresponding gimbal assemblies 26 have not been included in FIG. 5, for purposes of clarity; however, it will be understood that the E-block 20 includes a total of eight heads 28 (not shown in FIG. 5) which correspond to the surfaces of four discs 18 (also not shown in FIG. 5). Thus, the actuator arms 24B, 24C and 24D each have two gimbal assemblies extending therefrom, respectively, and the actuator arms 24A and 24E each have one gimbal assembly extending therefrom, respectively.

As shown in FIG. 5, the head wires 38A-38E are soldered to corresponding pads (collectively denoted as 56) on the PCB 44 of the flex circuit assembly 42. From the pads 56, the head wires 38A-38E extend to the wire guides 40A-40E without contacting the actuator arms 24A-24E, respectively. The head wires 38A-38E are thus respectively routed along base portions 46A-46E and through the channels formed from tabs 48A-48E and 50A-50E of the wire guides 40A-40E, as shown. As provided hereinabove, the configurations of the tabs 48A-48E and 50A-50E of the wire guides 40A-40E are selected to prevent contact between the head wires 38A-38E and the actuator arms 24A-24E.

Figure 6:
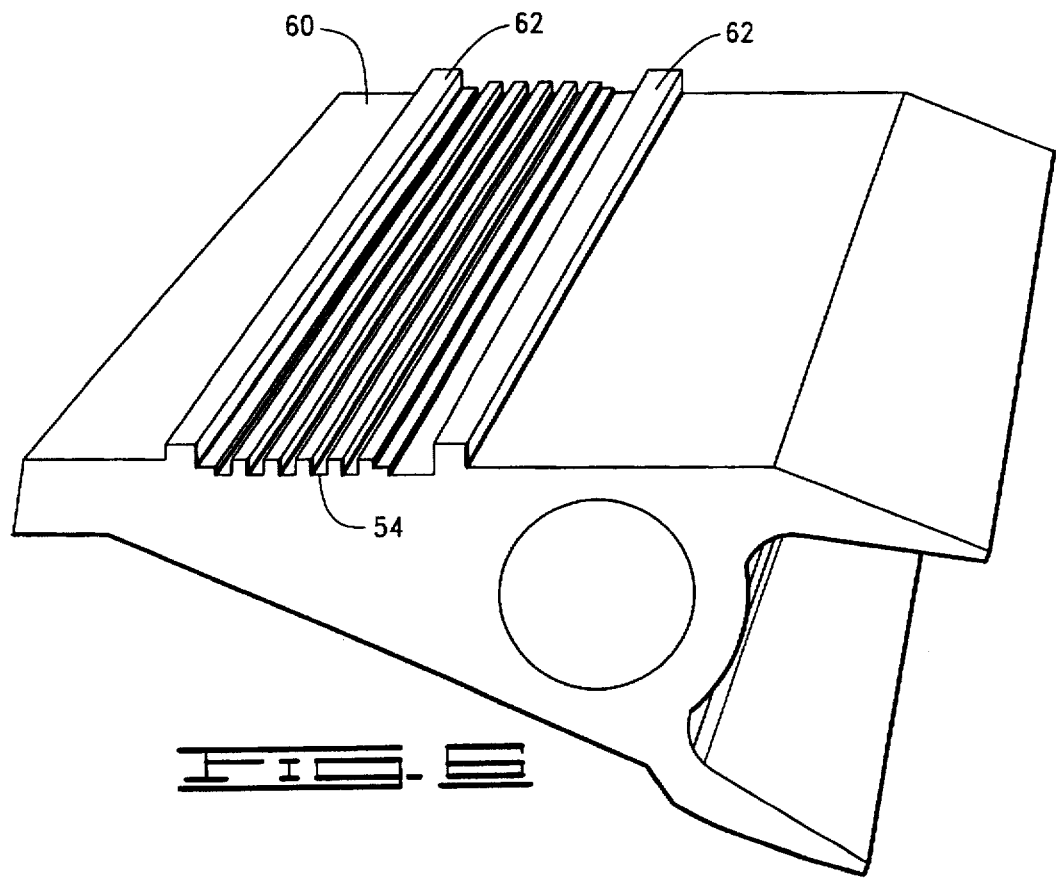
FIG. 6 is an isometric view of an extrusion from which the E-block is fabricated.

Having concluded a discussion of the configuration of the preferred embodiment of the present invention, the preferred method for fabricating the wire guides 40 will now be discussed. Referring to FIG. 6, shown therein is an isometric view of an extrusion 60 from which the E-block 20 is fabricated. More particularly, FIG. 6 shows the extrusion 60 to comprise an extruded piece of aluminum of a desired length and having the cross-sectional configuration as shown, which, as will be recognized, is similar to the configuration of the actuator arms 24 discussed hereinabove. Particularly, the extrusion 60 includes the grooves (one denoted at 54) shown previously in FIG. 4 for the actuator arm 24A. Additionally, a pair of dams 62 to retain epoxy are shown adjacent to and bounding the grooves 54. The dams 62 are not part of the finished actuator arms 24, but rather serve to facilitate the application of epoxy from which the wire guides are subsequently fabricated; particularly, the dams 62 are subsequently machined off.

As shown in FIG. 7, during the fabrication process, epoxy 70 is applied to the extrusion 60 between the epoxy dams 62. More particularly, it is contemplated that, while the epoxy 70 is still in a viscous state, the epoxy 70 is dispensed and troweled into the grooves 54 of the extrusion 60. The epoxy 70 comprises any suitable, non-conductive material which, once cured, will exhibit the desired mechanical and electrical properties required to retain the head wires 38, as disclosed herein. It will be recognized that such epoxies are readily available and are often used in disc drive manufacturing adhesive processes (such as, for example, in bonding the actuator coil 34 to the E-block 20, as configured in FIG. 1).

Although a flat surface for the mating of the epoxy 70 and the extrusion 60 could be used, in the preferred embodiment, the grooves 54 (and the resulting grooves 52 in the epoxy 70) provide additional surface area for the epoxy 70 to bond to the extrusion 60. Additionally, the resulting grooves 52, 54 provide "interlocking teeth" which can generally bear additional external forces resulting from the dynamic motion and vibration of the actuator arms 24.

Once the epoxy 70 is cured, the assembly of FIG. 7 is machined using a suitable machining process to produce the actuator arms 24 as disclosed. Particularly, the machining process includes the removing of the epoxy dams 62, the shaping of the epoxy 70 to have the resulting configuration as shown in FIGS. 1–5 and the machining of the remaining features of the actuator arms (including the slicing of the extrusion 60 into the desired thicknesses for the individual actuator arms 24). The actuator arms 24 are thereafter assembled into respective E-blocks 20, using conventional techniques such as discussed in the previously incorporated reference U.S. Pat. No. 5,404,636.

It will be recognized that the remaining surfaces of the completed actuator arms 24 are electrically conductive, as no insulating layer (with the exception of the wire guides 40) is provided, or indeed, necessary. Additionally, it will be recognized that the wire guides 40 could have a different number and configuration of the tabs 48, 50, depending upon the requirements of a particular application.

It will be clear that the present invention is well adapted to carry out the objects and attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A disc drive actuator assembly, comprising:

a pivot shaft assembly;

an actuator arm extending radially from the pivot shaft assembly about which the actuator assembly rotates;

a gimbal assembly extending radially from the actuator arm;

a head attached to the distal end of the gimbal assembly;

head wires routed from the head and along the gimbal assembly and the actuator arm; and an insulating wire guide comprising a rigid, non-conductive material molded onto the actuator arm to form a one-piece, integral wire guide-actuator arm unit, the wire guide having a base portion on which the head wires rest and tabs extending from the base portion to form a channel through which the head wires are routed, wherein the base portion of the wire guide is provided with sufficient radial length to prevent contact between the head wires and the actuator arm, and wherein the tabs are provided with sufficient height to retain the head wires adjacent the wire guide.

2. The disc drive actuator assembly of claim 1, wherein the wire guide is derived from a process comprising the steps of:

generating an actuator arm extrusion having a cross-sectional shape substantially that of the actuator arm, the extrusion including dams forming a channel along one side of the extrusion to facilitate application of the non-conductive material;

applying the non-conductive material to the extrusion, substantially filling the channel;

curing the non-conductive material; and machining the extrusion and the cured non-conductive material to generate the actuator arm and the wire guide.

3. The disc drive actuator assembly of claim 2, wherein the wire guide comprises epoxy.

4. The disc drive actuator assembly of claim 3, wherein the extrusion comprises aluminum.

5. The disc drive actuator assembly of claim 2, wherein the extrusion further includes a groove between the dams and within the channel, and the step of applying the non-conductive material to the extrusion includes the step of applying the non-conductive material to the groove, so that interlocking teeth are formed between the actuator arm and the wire guide.

6. A method for forming an insulating wire guide in an actuator arm of a disc drive actuator assembly, comprising the steps of:

generating an extrusion having a cross-sectional shape substantially that of the actuator arm, the extrusion including dams forming a channel along one side of the extrusion to facilitate application of a non-conductive material;

applying the non-conductive material to the extrusion, substantially filling the channel;

curing the non-conductive material; and machining the extrusion and the cured non-conductive material to generate the wire guide and the actuator arm.

7. The method of claim 6, wherein the non-conductive material comprises epoxy which is initially provided in a viscous state and subsequently cured to a rigid material.

8. The method of claim 7, wherein the extrusion is formed from aluminum.

9. The method of claim 6, wherein the extrusion further includes a groove between the dams and within the channel, and the step of applying the non-conductive material to the extrusion includes the step of applying the non-conductive material to the groove, so that interlocking teeth are formed between the actuator arm and the wire guide.

10. The method of claim 6, wherein the step of machining the extrusion and the cured non-conductive material is characterized as comprising the machining of the wire guide and the actuator arm during the same operation.

11. A disc drive, comprising:

a disc;

a pivot shaft assembly;

an actuator arm extending from the pivot shaft assembly and towards the disc;

a gimbal assembly extending from the actuator arm and towards the disc, the gimbal assembly having a distal end;

a head attached at the distal end of the gimbal assembly, a head wire routed from the head and along portions of the gimbal assembly and the actuator arm; and an insulating wire guide molded within a portion of the actuator arm to form a one-piece, integral wire guide-actuator arm unit and disposed between the actuator arm and the head wire, the wire guide comprising:

a base portion on which the head wires rest; and tabs extending from the base portion to form a notch through which the head wires are routed; and wherein the base portion of the wire guide is provided with sufficient radial length to prevent contact between the head wires and the actuator arm, and wherein the tabs are provided with sufficient height to retain the head wires adjacent the wire guide, thereby providing electrical insulation between the actuator arm and the head wire.

12. The disc drive actuator of claim 11, wherein the wire guide comprises non-conductive material.

13. The disc drive actuator of claim 11, wherein the actuator arm comprises aluminum.

14. The disc drive actuator of claim 12, wherein the actuator arm further comprises a channel, and wherein the wire guide non-conductive material substantially fills the channel.

15. A disc drive, comprising:

a disc;

an actuator assembly adjacent the disc, the actuator assembly comprising:
 a pivot shaft assembly;
 an actuator arm extending from the pivot shaft assembly and towards the disc;
 a gimbal assembly extending from the actuator arm and towards the disc, the gimbal assembly having a distal end;
 a head attached at the distal end of the gimbal assembly;
 a head wire routed from the head and along portions of the gimbal assembly and the actuator arm; and
 an insulating head wire guide having a base portion and tabs extending from the base portion to form a notch through which the head wire is routed, the wire guide being molded onto the actuator arm to form a one-piece, integral wire guide-actuator arm unit disposed between the actuator arm and the head wire, thereby providing electrical insulation between the actuator arm and the head wire.

16. The disc drive of claim 15, wherein the wire guide is derived by a process comprising the steps of:
 providing an extrusion having a cross-sectional shape substantially that of the actuator arm, the extrusion including a channel;
 applying insulating material to the extrusion, substantially filling the channel; and
 forming the insulating wire guide and the actuator arm from the extrusion.

17. The disc drive of claim 16, wherein the wire guide comprises a base portion on which the head wire rests, and tabs extending from the base portion to form a notch through which the wires are routed, wherein the tabs retain the head wire proximate to the base portion.

* * * * *

UNITED STATES PATENT AND TRADEMARK OFFICE
CERTIFICATE OF CORRECTION

PATENT NO. : 5,731,930
DATED : March 24, 1998
INVENTOR(S) : Maggio et al.

It is certified that error appears in the above-identified patent and that said Letters Patent is hereby corrected as shown below:

Column 10, line 8, the text should immediately follow the last word "of" on column 10, line 7.

Signed and Sealed this

Twenty-fourth Day of November, 1998

BRUCE LEHMAN

Attest:

Attesting Officer

Commissioner of Patents and Trademarks